United States Patent [19]

Chung

[11] 4,000,884

[45] Jan. 4, 1977

[54] EXTRUDER SCREW

[76] Inventor: Chan I. Chung, 2483 Whitehall Court, Schenectady, N.Y. 12309

[22] Filed: July 25, 1975

[21] Appl. No.: 599,004

[52] U.S. Cl. .................................. 259/191; 259/9; 259/25; 259/45; 259/97

[51] Int. Cl.² ........................................ B29B 1/10

[58] Field of Search ............. 259/191, 192, 193, 9, 259/10, 25, 26, 45, 46, 97

[56] References Cited

UNITED STATES PATENTS

| | | | |
|---|---|---|---|
| 3,271,819 | 9/1966 | Lacher | 259/191 |
| 3,698,541 | 10/1972 | Barr | 259/191 |
| 3,701,512 | 10/1972 | Schippers et al. | 259/191 |
| 3,858,856 | 1/1975 | Hsu | 259/191 |
| 3,867,079 | 2/1975 | Kim | 259/191 |

*Primary Examiner*—Richard E. Aegerter
*Assistant Examiner*—L. Footland

[57] ABSTRACT

An extruder screw for plastic extruding apparatus effects continuous separation of the molten plastic from the unmolten plastic with minimal interference with the flow of the plastic material being processed. Optionally, means are provided for additional mixing and homogenization of the molten plastic.

10 Claims, 2 Drawing Figures

EXTRUDER SCREW

BACKGROUND OF THE INVENTION

This invention relates to an improved extruder screw for use in an extrusion apparatus for working a wide range of solid plastic materials into a substantially homogeneous, molten state suitable for formation into any desired shape by extrusion or injection into a die or mold. More particularly the improved extruder screw, hereinafter, for brevity, referred to as screw, of the present invention is most readily used in what is known as the single screw extruder.

Extrusion, injection molding or blow molding with a single screw extrusion machine or apparatus includes feeding the solid plastic or polymeric material in pellet, chip, powder or flake form to the inlet end or feed section through a hopper mounted in an opening in the top side at or near the drive end of a heated barrel in which the screw is rotatably mounted. The screw includes at least one helical thread integrally mounted or formed on the core to create a channel, down which the plastic is moved downstream from the inlet end to the discharge end by forces exerted by the rotation of the screw.

In the beginning of the art of extrusion, screws having uniform pitch and uniform thread depth were used. It soon became apparent that such screws were very inefficient in bringing the solid plastic material to the desired homogeneous molten condition. Many variations were tried to overcome the problems encountered in trying to improve the technique of extrusion and the very closely related technique of injection molding and blow molding. Some of these variations involved change of pitch, change of channel depth between adjacent threads, providing different sections along the length of the screw where pitch and/or channel depth were varied from section to section. Although these variations did provide significant improvement in the quality of the articles formed by extrusion or injection, hereinafter included within the term extrusion, further improvement was desired.

A review of the more recent art shows that in order to improve the homogenity of the melt, A. J. Palfey, in U.S. Pat. No. 3,023,456, filed Aug. 3, 1959, feeds molten material from another source to an extruder having a screw with varying root diameter along its length to improve mixing of the molten material as it is forced down the screw.

Maillefer, S. A., a Swiss corporation, was issued British Pat. No. 964,428, published July 22, 1964, for an extruder screw having a constant core diameter that provides several means for separating the molten material from the solid material. One of the means provides a central passage along the axis of the screw into which the molten material flows through small holes in the land of the thread from the main feed channel. Another means uses two threads with different pitch and diameter. The pitch of each thread is such that the second thread originates out of the first or feed thread near the inlet end of the screw where the solid material is fed to the screw and again merges with the feed thread just prior to the discharge end of the screw. The second channel created by the second thread widens downstream while the first or feed channel narrows. The feed thread has a diameter that provides the normal clearance between the thread and the heated barrel while the diameter of the second thread is slightly smaller so that only the molten material can flow over the land of the thread. In the preferred embodiment the feed thread has less pitch so that as molten material is formed it flows over the second thread of less diameter and greater pitch.

A similar type of extruder screw is used by P. Geyer in U.S. Pat. 3,375,549, filed Apr. 5, 1961 for refining and separating plastic material, more particularly, for refining cured or scorched rubber compounds and for separating larger hard particles therefrom. Because of the blind end created by the merging of the two threads, any solid material at the discharge end of the screw is trapped. To remove this trapped solid material, Geyer provides a weep hole at the discharge end which permits the discharge of the solid material separately from the molten refined material.

F. K. Lacher, in U.S. Pat. No. 3,271,819, filed Feb. 26, 1962, disclosed another type of extruder which is similar to Geyer and Maillefer. His screw has a feed section, a transition section and a metering section, and is provided with means for permitting restricted communication between the feed channel and the second channel such that the flow of large particles of unplasticized material from the feed channel to the second channel is restricted. The root diameters of both the original feed channel and the second channel are increased progressively along the transition section.

M. A. Natov, et. al., in U.S. Pat. No. 3,504,400, filed Oct. 23, 1967, are not concerned with the separation of molten material from solid material, but with the providing of resistance to back-flow of plasticized or molten material. They accomplished this by providing a second thread of different pitch intermittently along the first thread. The second thread is of less diameter and makes no contact with the first thread. Although the difference in pitch of the two threads causes some material to flow from one channel to the other, molten material is not separated from solid material at the start or end of the second thread.

H. Schippers et. al., in U.S. Pat. No. 3,701,512, filed Apr. 7, 1971, use a pair of parallel threads of equal pitch. The second thread starts downstream of the first thread in the center of the channel created by the first thread to create two channels of equal cross-sectional area. The diameter of the second thread is such that its clearance with the heated barrel is at least twice that of the first thread. The second thread acts as a shearing screw as material, either solid or molten, is forced to flow over it by inversely varying the root diameters of the two channels. Like Natov et. al., solid material as well as molten material can be present in both channels since no separation is provided at the start or end of the second channel.

R. A. Barr, in U.S. Pat. No. 3,698,541, filed Aug. 11, 1971, provides such separation. He accomplishes this by using a tapered, forward widening of the feed thread at the end of the feed section. At the start of the next section, which he calls the melting section, the diameter of the leading edge of the widened thread is progressively decreased to the desired diameter of a second thread so that only molten material can flow over the second thread. The undercutting used to effect this decrease in diameter is then continued in such a way as to create the second thread with a constant diameter and a constant pitch but with a subchannel behind it whose root diameter progressively decreases along the melting section. At the same time the root diameter of the original feed channel progressively increases along the melting section to the diameter of the second thread causing the second thread to disappear near the end of the melting section. At the start of the next or transition section, the root diameter of the subchannel is rapidly increased while the root diameter of the original feed channel is rapidly decreased so that the root diameters of the two channels become equal to provide a metering channel of a constant root diameter.

In U.S. Pat. No. 3,858,856, filed Jan. 26, 1973, J. S. Hsu uses an extruder screw similar to Barr but initiates the second thread by a different means. Instead of widening the feed thread in the forward direction, he widens it in the backward direction and immediately decreases the diameter of the leading edge to form a second or barrier thread and starts a second channel behind the barrier thread. The original diameter of the feed thread is maintained on the trailing edge of the widened thread to form a main thread which continues to the end of the screw. In this way, Hsu narrows the feed channel one turn ahead of that of Barr. Another difference is that the barrier thread, the one with the smaller diameter, is a continuation of the feed thread in Hsu's screw whereas in Barr's screw the barrier thread is offset forwardly and not a continuation of the feed thread.

While both screws of Barr and Hsu do provide means for separating the molten material from the solid material, they do it at the expense of narrowing the feed channel down which the solid material is being forced to move by the rotation of the screw, thus impeding the smooth flow of the solid material down the channel. It would be highly desirable to eliminate this impediment of flow.

It is an object of this invention to obtain an efficient and uniform melting of solid plastic material during preparation thereof for extrusion with the least possible interference to the material flow in the screw channel.

Objects ancillary to the foregoing are to teach and define a method to accomplish said objective.

Another object is to provide a method and apparatus for progressively melting solid plastic material in such manner as to establish maximum heat transfer area between the heated barrel of an extruder and the solid material.

A further object is to provide an extruder screw in conformity with the above-cited objects which is easy to manufacture.

It is another object to reduce the power input and thus to reduce the temperature of the molten material as a result of lower shear energy inputs in conveying the molten material in a melt channel separated from the solid material in a solid channel.

Another object, which can be used in conjunction with the above stated objects, to even further ensure homogenity of the discharge molten material, is to provide means for a second transfer of the molten material over a barrier thread inside the extruder.

SUMMARY OF THE INVENTION

The above objects are accomplished by providing an extruder screw structure which subjects the solid feed material to the maximum possible inner surface area of the heated extruder barrel for the maximum plasticization or melting with the least possible interference to the material flow. The screw structure provides separate screw channels for the solid material and the molten material, and causes the molten material as it is formed in the solids channel to flow into the melt channel over a barrier thread which prevents the transfer of the solid material. The optional second transfer of the molten material from the melt channel over a second barrier thread before it is discharged from the screw can be provided in the screw structure. The melt channel originates without a blind end, thus without significantly reducing the total cross-sectional area of the screw channel and without causing significant interference to the material flow in the screw channel. The solid channel terminates without a blind end, thus avoiding the possible fluctuation in the extrusion rate that occurs when a substantial amount of solid material reaches the blind end of the solid channel.

BRIEF DESCRIPTION OF THE DRAWINGS

The structures and advantages of the extruder screw of the present invention will be better understood and appreciatd by referring to the following detailed description read in conjunction with the accompanying drawings, wherein.

DETAILED DESCRIPTION OF THE INVENTION

Figure 1:
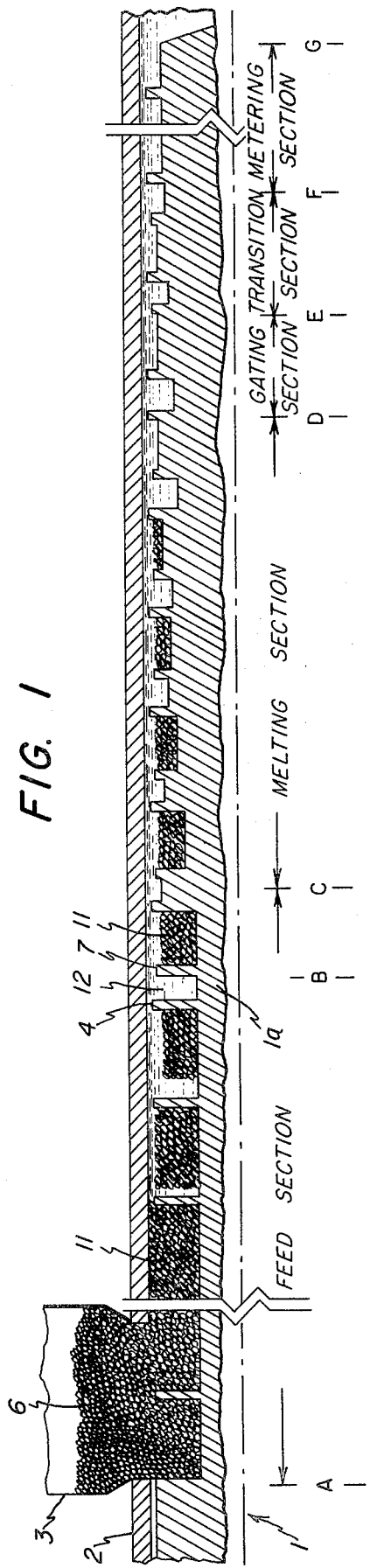
FIG. 1 is a partial, fragmented, cross-sectional view of an extruder having the screw of the present invention.

Referring now to the drawings, a single screw extruder is shown in FIG. 1 comprising a conventional hopper 3 and a conventional cylindrical barrel 2 which houses the extruder screw of this invention, which comprises a rotor or screw 1 including a core 1a having integral therewith at least one pair of substantially parallel, helical threads 4 and 7, of which thread 4 is the primary thread and thread 7 is the secondary thread.

Starting from the inlet end or feed end A of screw 1 and proceeding to the outlet end or discharge end G of screw 1, the section between A and C is the feed section with B marking the point of origination of secondary thread 7, the section between C and D is the melting section, the section between D and E is the gating section, the section between E and F is the transition section and the section between F and G is the melting section.

The actual number of turns of threads 4 and 7 around core 1a, hereinafter called turns for brevity, in any section is not a critical feature of this invention. The actual number of turns is based on the particular desires and requirements of the user of screw 1. The number of threads and the pitch of the threads as well as other conventional screw design features can be changed from those indicated in the drawing without affecting the critical features of this invention as disclosed and claimed.

The main objects of this invention are accomplished by the features disclosed for the feed section and the melting section. Generally, when only these features are used, screw 1 is provided with any one of the conventional metering sections of the prior art. However, as more fully discussed later, additional advantages are attained by including the described and illustrated gating section and transition section in conjunction with the disclosed and illustrated feed section and melting section. In this case it is generally desirable, but not requisite, to include a conventional metering section of the prior art such as that shown in FIGS. 1 and 2.

Figure 2:
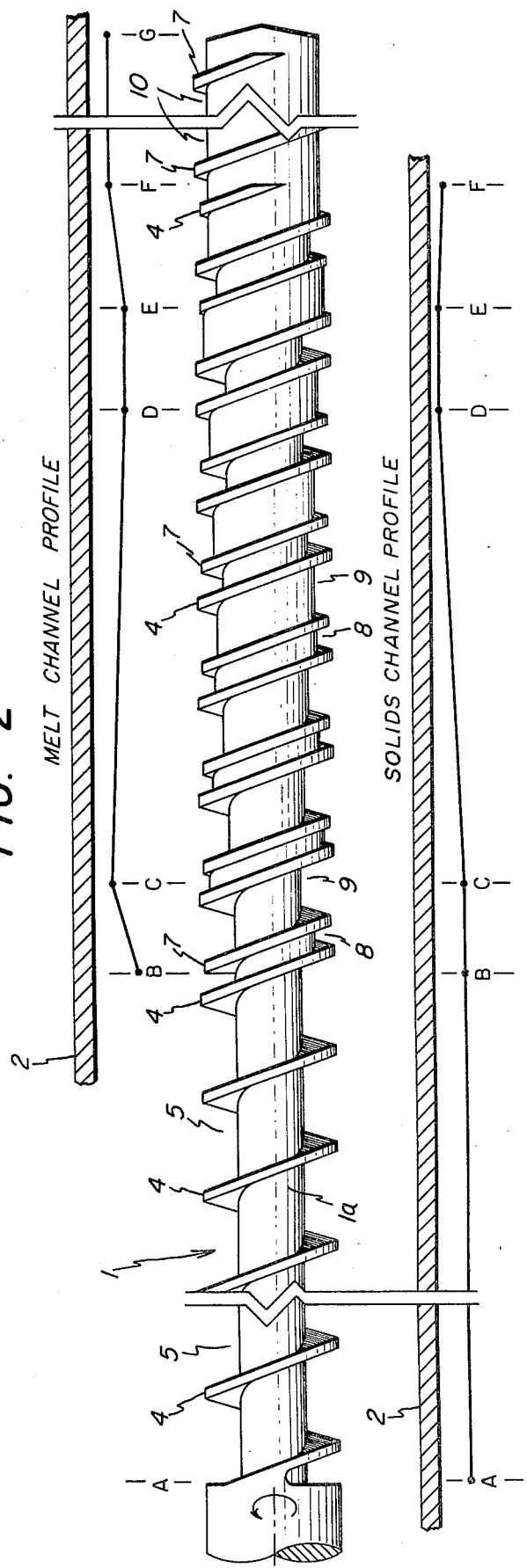
FIG. 2 is a longitudinal, fragmented view of a preferred embodiment of the screw structure of the present invention together with the profiles showing preferred relative channel depths of the screw channels. However, it should be noted that the number of turns of threads shown is not critical and can be varied to meet the desire of the user yet retaining the relative proportions of the root diameters of the respective channels.

The clearance between primary thread 4 and the inner surface of barrel 2 between A and E is substantially constant and is that of a conventional extruder. Primary thread 4, having a substantially constant pitch over its entire length, creates a feed channel 5 between A and B as shown in FIG. 2. The root diameter of feed channel 5 is usually smallest and substantially constant over two or more turns of primary tread 4, but, as is known in the art, its root diameter can be progressively increased gradually, if desired, to accommodate the packing or compression of the solid feed material.

Secondary thread 7 originates in the downstream half of the feed section at B dividing feed channel 5 into two open-ended new channels, melt channel 8 and solids channel 9 as shown in FIG. 2. At B, the longitudinal cross-sectional area, hereinafter referred to as cross-sectional area for brevity, of solids channel 9 is greater than the cross-sectional area of melt channel 8. Generally, the cross-sectional area of melt channel 8 is 20-40 percent, preferably 25-35 percent of the cross-sectional area of feed channel 5 at B. At B the root diameters of melt channel 8, solids channel 9 and feed channel 5 are substantially equal to each other. Therefore, at B, the cross-sectional areas of channels 8 and 9 are proportional to their longitudinal widths. It is convenient to have the longitudinal width of solids channel 9 be twice the longitudinal width of melt channel 8, but other ratios may be used. The diameter of secondary thread 7 from B to D is substantially constant and is less than the diameter of primary thread 4 from A to E and is so chosen that the clearance between secondary thread 7 and barrel 2 from B to D will permit only molten material to flow from solids channel 9 to melt channel 8. The pitch of secondary thread 7 will be substantially equal to the pitch of primary thread 4 since they are substantially parallel to each other. The beginning edge of secondary thread 7 most conveniently arises vertically from the floor of feed channel 5, but may be a sloped or curved surface, if desired, as viewed in the direction of the screw axis. This edge may be blunt, tapered, rounded or other desired shape. Preferably it is so shaped as to minimize resistance to the advancing stream of molten and solid material.

Referring to the channel profiles in FIG. 2, it should be noted that these profiles schematically show the relationship of the various channels to each other as a function of their depth measured from the inside wall of barrel 2 in order to improve the visual perception of the present invention. It will be readily apparent that a decrease of one unit in channel depth corresponds to an increase of one unit in root diameter of the channel.

Screw 1 is rotated by a drive assembly which is not shown because it is not related to the present invention. Barrel 2 generally has conventional heating and cooling means, also not shown. If desired, core 1a can also be provided with conventional heating and cooling means, also not shown. Screw 1, especially of larger diameter, can have two or more pairs of parallel threads 4 and 7. Hopper 3 holds solid material 6, such as plastic or polymer, food, or animal feed, which is fed into screw 1 by gravity. If desired, hopper 3 can be provided with any one of the well-known, conventional feeding devices. Solid material 6 is usually in the form of pellet, powder, chip, bead, flake or crumb, which is compacted into solid plug 11 in feed channel 5 due to the rotation of screw 1. Solid plug 11 is plasticized or melted primarily on the heated, inner surface of barrel 2 as it is conveyed from inlet end A toward discharge end G. Molten material 12 on the inner surface of barrel 2 is scraped from barrel 2 by the advancing, leading edge of primary thread 4 and collected on the leading face of primary thread 4 as a pool of molten material 12, which grows at the expense of solid plug 11 as solid plug 11 is conveyed downstream.

In a conventional extruder, where no means are provided for separation of molten material from solid material, the solid plug frequently breaks up and mixes with the pool of molten material. When this happens, the dispersed solid material can only melt from the heat conducted by the surrounding molten material, which is a slow process due to the low thermal conductivity of the molten polymer compared with the melting process of the solid plug on the inner surface of the barrel. As a result, melting of the dispersed solid material is often incomplete resulting in inclusion of incompletely molten material in the extrudate, which causes poor quality of the formed articles. The novel screw 1 of the present invention, illustrated in FIGS. 1 and 2, prevents break-up of solid plug 11 and eliminates the possibility of discharging incompletely molten material mixed with molten material 12 from screw 1 by providing separate channels for solid plug 11 and molten material 12.

At B, in the downstream half of the feed section, where the pool of molten material 12 has grown to a significant size, i.e., its cross-sectional area is 20-40 percent, preferably 25-35 percent of feed channel 5, but before any break-up of solid plug 11 has occurred, secondary thread 7, having substantially the same pitch as primary thread 4, originates separating feed channel 5 into open-ended melt channel 8 and open-ended solids channel 9. At this point, the cross-sectional area of melt channel 8 is preferably equal to the cross-sectional area of the pool of molten material 12, but can vary therefrom by ± 10 percent of the cross-sectional area of feed channel 5.

From the above description, it is evident that one particular advantage of the screw structure of the present invention, in comparison with the screw structures of the prior art, is that melt channel 8 originates at B: (a) without a blind end, (b) without significantly reducing the total cross-sectional area of the channels between adjacent turns of primary thread 4, (c) without causing significant interference to the material flow from feed channel 5, and (d) without creating a dead spot where molten material 12 can become stagnant.

From B to C, the root diameter of melt channel 8 progressively increases so that at C it becomes preferably, but not necessarily, at least as large as the root diameter of metering channel 10 at G, but no greater than the diameter of secondary thread 7 between B and D. When the root diameter of melt channel 8 at C is increased to the maximum value, i.e., to the diameter of secondary thread 7 between B and D, all of the molten material in melt channel 8 downstream of C will have been subjected to the equivalent of flowing over a barrier equivalent to secondary thread 7 between B and D. The root diameter of solids channel 9 preferably remains substantially constant from B to C as illustrated schematically by the channel depth profiles shown in FIG. 2. However, like the root diameter of feed channel 5 from A to B, this root diameter can be progressively increased gradually, if desired. C is usually located no more than two turns, preferably one-half to one turn of secondary thread 7 downstream from B. Any solid feed material 6 which might enter melt channel 3 at B will be melted by the time it reaches C because of the shearing forces created by the increase in the root diameter of melt channel 8 between B and C.

In the melting section between C and D, which generally contains about two to twenty turns of the pair of threads 4 and 7, the root diameter of solids channel 9 progressively increases gradually while the root diameter of melt channel 8 progressively decreases gradually, i.e., the depth of solids channel 9 progressively decreases gradually and the depth of melt channel 8 progressively increases gradually as schematically illustrated in the channel depth profiles shown in FIG. 2. The root diameter of solids channel 9 at D is preferably, but not necessarily, at least as large as the root diameter of metering channel 10 at G, but no greater than the diameter of secondary thread 7 between B and D. When it is desired that the entire solid material in solid plug 11 entering solids channel 9 at B will be molten and transferred to melt channel 8 by the time it reaches D, it is evident that this can be effected by progressively increasing the root diameter of solids channel 9 in the melting section between C and D to a value so that at D it is equal to the diameter of secondary thread 7 between B and D.

The root diameter of melt channel 8 at D is preferably such that the total cross-sectional area of melt channel 8 and solids channel 9 at D is at least equal to the cross-sectional area of metering channel 10 at F.

Solid plug 11 continues to melt primarily on the inner surface of barrel 2 as it is conveyed down solids channel 9 through the melting section from C to D, and it will be completely melted by the time it reaches D because of the shearing forces created by the increase in the root diameter of solids channel 9 between C and D. Molten material 12 recieves an intensive shearing action and thus becomes refined and homogenized as it flows over secondary thread 7 in the melting section between C and D. Some plastic materials are sufficiently worked by the time they reach this stage and they can be extruded, if desired, generally by using a conventional metering section after D. Where additional homogenization or shearing action is desired, the disclosed and illustrated unique gating and transition sections can be used, generally in conjunction with a conventional metering section.

In the gating section from D to E, which is generally no more than two turns but more than one half turn of the pair of threads 4 and 7, the root diameters of both melt channel 8 and solids channel 9 remain substantially constant. The diameter of secondary thread 7 is increased at D to substantially the diameter of primary thread 4 between A and E and continues at substantially this diameter until its termination at G. Therefore, molten material 12 cannot flow either from solids channel 9 into melt channel 8 or vice versa between D and E.

In the transition section from E to F, which usually is two to eight turns of the pair of threads 4 and 7, the diameter of primary thread 4 is decreased at E to substantially the diameter of secondary thread 7 between B and D so that molten material 12 can flow over primary thread 4 from melt channel 8 into solids channel 9, and the root diameter of melt channel 8 is progressively increased in one of two ways. It can be progressively increased from E to F so that at F it is substantially equal to the root diameter of metering channel 10 at F. The root diameter of metering channel 10 from F to G usually is substantially constant. Alternatively, the root diameter of melt channel 8 can be progressively increased from E up to about one turn or less of the pair of threads 4 and 7 upstream of F to a value greater than the root diameter of metering channel 10 at F but no greater than the diameter of primary thread 4 between E and F, and thereafter, the root diameter of melt channel 8 is progressively decreased so that at F it is substantially equal to the root diameter of metering channel 10 at F. By increasing the root diameter of melt channel 8 to the maximum value, i.e., the diameter of primary thread 4 in the transition section, complete transfer of molten material 12 from melt channel 8 to solids channel 9 is attained.

The root diameter of solids channel 9 progressively decreases from E to F so that at F it is substantially equal to the root diameter of metering channel 10 at F. Thus the root diameters of melt channel 8 and solids channel 9 become substantially equal to each other at F and also equal to the root diameter of metering channel 10 at F.

The molten material 12 is subjected to a second intensive shearing action and becomes further refined and homogenized as it flows over primary thread 4 in the novel transition section. This highlights still another advantage of the screw structure of the present invention in comparison to the screw structures of the prior art in that the molten material 12 collected in melt channel 8 is subjected to further refining or homogenization in the transition section before it is discharged from screw 1.

Another advantage of the screw structure of the present invention in comparison to some of the screw structures of the prior art is that the solids channel 9 terminates at F without a blind end, thus avoiding any fluctuation in the extrusion rate that occurs when a substantial amount of unmolten material reaches the blind end where it remains stagnant until it is melted.

Primary thread 4 terminates at F combining melt channel 8 and solids channel 9 into a metering channel 10. The variations in root diameters of melt channel 8 and solids channel 9, as described above, have ensured complete melting of solid plug 11 before it reaches F. Molten material 12 from melt channel 8 and from solids channel 9 are mixed together in metering channel 10 to further ensure homogenization of molten material 12 before it is discharged from screw 1 at discharge end G resulting in uniform, high quality molten extrudate.

The termination of primary thread 4 at F preferably is accomplished by the same means as described above for the origination of secondary thread 7 at B. In addition, primary thread 4 can be terminated by rapidly and progressively increasing its pitch in no more than one turn, preferably no more than one-quarter turn of primary thread 4, so that it merges with the adjacent, downstream secondary thread 7. Over the termination portion where the pitch it increased, the diameter of primary thread 4 usually is maintained substantially constant at substantially its same value from E so that all of molten material 12 in melt channel 8 will be subjected to a second shearing action while flowing over primary thread 4. In essence, the termination of primary thread 4 by rapidly increasing its pitch provides an alternative, but less desirable means of ensuring a second transfer of molten material 12 over a barrier as is provided by increasing the root diameter of melt channel 8 in the transition section to its maximum value as discussed previously.

When it is desired to subject the entire feed solid material 6 either one or two times to the refining and shearing action provided by a restrictive barrier equal to that provided by secondary thread 7 in the melting section, thus ensuring complete homogeneity and complete absence of unmolten or incompletely molten material in the extrudate, it is obvious from the above discussion that this desire can be attained by using one or more of the maximum disclosed values for the root diameters of melt channel 8 at C, melt channel 8 at a point slightly upstream of F and solids channel 9 at D. However, for most plastic materials complete melting and homogeneity is achieved readily with the above-described screw 1 by using less than these maximum values.

Some of the important advantages, other than those already mentioned above, in screw 1 of the present invention in comparison to the screws of the prior art, are an increased melting capacity resulting from the increased contact area between solid plug 11 and barrel 2, a lower melt temperature resulting from the fact that the molten material 12 is collected and transported in the deep melt channel 8, and a more stable extrusion rate resulting from the fact that the width of solid plug 11 is kept constant and its thickness is decreased during the melting process to compensate for the amount of molten material 12 transferred from solids channel 9 to melt channel 8 thereby avoiding gross deformation and possible break-up of solid plug 11. It should be remembered that the thickness, not the width, of solid plug 11 is decreased by the melting process because melting occurs primarily at the top of solid plug 11 between the inner surface of barrel 2 and solid plug 11.

The present invention obviously is not limited to screw 1 illustrated in FIGS. 1 and 2. Some of the variations have been discussed in conjunction with the description of the preferred embodiments. One possible further modification is that secondary thread 7 terminates at F and primary thread 4 continues from F to G with its diameter restored to substantially its initial value between A and E. Another modification is that screw 1 ends at F. Still another modification is that the gating section between D and E is very short, eliminated or replaced by extension of the melting section and/or the transition section. Although it is generally desirable to maintain the diameters of threads 4 and 7 substantially constant in each section as disclosed, if one should desire to vary the thread diameter in any section for any reason, for example, to change the rate of transfer of molten material 12 from solids channel 9 into melt channel 8 along the melting section, this can be accomplished by varying the appropriate thread diameter from its normal value at the place where a variation in transfer rate is desired. Still another modification is that primary thread 4 terminates at E, rather than at F. In this case, the spreading of molten material 12 from the deep melt channel 8 into the shallow solids channel 9 is aided by the rotation of screw 1, unlike the screws of the prior art. If desired, the discharge end of screw 1 can be connected to another extruder or other apparatus utilizing molten feed material.

Where I have taught that certain values are substantially constant or substantially equal, by which I mean within the normal, acceptable machining tolerances, such values are desirable to obtain the maximum advantages of my invention. Therefore, it is to be understood that variations outside these tolerances can be made without sacrificing all of the advantages of my invention.

All of these variations as well as other variations or modifications which will be readily apparent to those skilled in the art on reading this disclosure in conjunction with the accompanying drawings are within the full and intended scope of the invention as defined by the attached claims.

I claim:
1. An extruder screw comprising:
a feed section along the inlet end of said screw:
a melting section along an intermediate section of the screw:
at least one pair of substantially parallel, helical, primary and secondary threads of substantially constant pitch, integral with a core, each of said threads having a leading edge and a trailing edge;
said primary thread of the pair:
originating at the beginning of said feed section to form a feed channel, defined by the leading edge of the primary thread and the trailing edge of the adjacent, downstream primary thread;
continuing through said melting section;
having a substantially constant diameter in both the feed section and the melting section;
said secondary thread of the pair:
originating in the downstream half of the feed section by its beginning edge arising from the floor of said feed channel without causing significant interference to the material flow from the feed channel;
continuing through the melting section;
having a substantially constant diameter in both the feed section and the melting section, which is less than the diameter of the primary thread of the pair in the same two sections:
the feed channel being divided by said beginning edge of the secondary thread into an open-ended melt channel, defined by the leading edge of the primary thread and the trailing edge of the secondary thread of the pair, and an open-ended solids channel of larger cross-sectional area than that of said melt channel, defined by the leading edge of the secondary thread and the trailing edge of the adjacent, downstream primary thread;
the root diameters of the melt channel, said solids channel and the feed channel, measured at the origin of the secondary thread, being substantially equal to each other;
the initial root diameter of the melt channel progressively increasing to the downstream end of the feed section to a value which is no greater than the diameter of the secondary thread in the same section and, thereafter, progressively decreasing in the melting section;
the root diameter of the solids channel progressively increasing in the melting section to a value which is no greater than the diameter of the secondary thread in the same section.

2. The extruder screw of claim 1 wherein the root diameters of the feed channel and the solids channel in the feed section are substantially constant and equal to each other.

3. The extruder screw of claim 1 wherein, adjacent downstream of the melting section, the screw comprises:

a gating section characterized by:

the solids channel and the melt channel from the melting section being continued at substantially their same root diameters as they had at the end of the melting section;

the diameter of the secondary thread increasing at substantially the start of said gating section to substantially the diameter of the primary thread of the pair in the feed section and the melting section and, thereafter remaining substantially constant, thereby stopping flow of molten material between the melt channel and the solids channel in the gating section;

the diameter of the primary thread decreasing at substantially the end of the gating section to substantially the diameter of the secondary thread in the feed section and the melting section and, thereafter, remaining substantially constant until its termination, whereby molten material can flow over the primary thread from the melt channel into the solids channel in the hereinafter defined transition section;

a transition section characterized by:

the solids channel and the melt channel from the gating section being continued with the root diameter of the solids channel progressively decreasing, and the root diameter of the melt channel progressively increasing to a value which is no greater than the diameter of the primary thread in said transition section, with the proviso that, when the root diameter of the melt channel is increased in the transition section to a value greater than the root diameter of the solids channel at the downstream end of the transition section, the root diameter of the melt channel is rapidly and progressively decreased so that at the end of the transition section both said root diameters are substantially equal;

the termination of the primary thread occurring at substantially the end of the transition section.

4. The extruder screw of claim 3 wherein the root diameters of the feed channel and the solids channel in the feed section are substantially constant and equal to each other.

5. The extruder screw of claim 3 wherein the root diameter of the melt channel in the transition section is progressively increased to a value substantially equal to the root diameter of the solids channel at the downstream end of the transition section.

6. The extruder screw of claim 5 wherein the primary thread is terminated by rapidly increasing its pitch so that in no more than one turn it merges with the adjacent, downstream secondary thread.

7. The extruder screw of claim 5 wherein the primary thread is terminated by rapidly decreasing its diameter to a value substantially equal to the root diameter of the solids channel.

8. The extruder screw of claim 3 wherein, adjacent downstream of the transition section, the screw comprises:

a metering section along the discharge end of the screw characterized by:

the secondary thread of the pair being continued from the transition section to its termination at the end of said metering section to form a metering channel, defined by the leading edge of the secondary thread and the trailing edge of the adjacent, downstream secondary thread;

the root diameter of said metering channel being substantially constant and equal to the root diameters of the melt channel and the solids channel at the downstream end of the transition section.

9. The extruder screw of claim 8 wherein the root diameters of the feed channel and the solids channel in the feed section are substantially constant and equal to each other.

10. The extruder screw of claim 9 wherein the root diameter of the melt channel in the transition section is progressively increased to a value substantially equal to the root diameter of the solids channel at the downstream end of the transition section.

* * * * *